United States Patent [19]

Thackery

[11] 4,027,709

[45] June 7, 1977

[54] TRACTOR MOUNTED LOG SPLITTER

[76] Inventor: Russell H. Thackery, 2376 Brentwood Road, Columbus, Ohio 43209

[22] Filed: Apr. 19, 1976

[21] Appl. No.: 678,352

[52] U.S. Cl. .............................. 144/193 R; 74/15; 180/53 WA; 144/3 K; 254/131

[51] Int. Cl.² ...................... A47J 49/02; B27L 7/00

[58] Field of Search ....... 144/193 R, 193 A–193 D, 144/2 R, 3 K, 194; 180/53 R, 53 WA, 53 A, 53 B, 53 D; 74/13, 15, 15.6, 15.69; 254/131

[56] References Cited

UNITED STATES PATENTS

| | | | |
|---|---|---|---|
| 1,407,533 | 2/1922 | Hensley | 74/15 X |
| 2,137,940 | 11/1938 | Goodman | 180/53 WA |
| 2,222,116 | 11/1940 | Mott | 254/131 X |
| 3,667,728 | 6/1972 | Garelick | 254/131 X |

*Primary Examiner*—Othell M. Simpson
*Assistant Examiner*—W. D. Bray
*Attorney, Agent, or Firm*—Mahoney and Stebens

[57] ABSTRACT

This invention relates to log splitters and more particularly to an apparatus adapted for use with a conventional four wheel garden tractor. The apparatus is characterized by a log splitting tool that is removably mounted on a hub of a driven wheel of the tractor and further includes a tractor lifting and support framework which is readily attached to the rear of the tractor and provides means for lifting the driven wheel to a position clear of the ground and further serves to stably support the tractor in this position. As another feature, the tractor lifting and support means is adjustable to a mobile position and therein functions as a transporting bracket for the log splittng tool when it is removed from mounted relationship on the drivén wheel.

14 Claims, 6 Drawing Figures

22-A
30-A
34-A
26
28
30
32
34
36
38
39
40
42
44
46
50
52
54
56
58
60
62
64
66
68
69
70
71
73
74
78
79
82
84
86
88
90
92
94
96

TRACTOR MOUNTED LOG SPLITTER

BACKGROUND OF THE INVENTION

This invention relates generally to log splitting apparatus and more particularly to such an apparatus which is adapted to be removably mounted on a conventional garden tractor.

SUMMARY OF THE INVENTION

In general, the log splitter of the present invention comprises a log splitting tool which is adapted to be removably mounted on the driven wheel of a tractor and thereby is powered by the tractor engine when the driven wheel is positioned clear of the ground.

The apparatus is further characterized by a tractor lifting and support means which can be removably mounted on the existing rear axle housing and draw bar of the tractor and which includes a jack means, or pivotally mounted portion, for lifting the driven wheel clear of the ground with such lifting means being selectively positionable in a ground engaging support portion wherein it serves the additional function of providing a stop bar for arresting rotation of a log while it is being penetrated by the splitting tool.

As still another feature, the pivotally mounted portion can be disposed in a mobile position wherein it is clear of the ground and forms a bracket by transporting the log splitting tool after it is removed from the hub of the driven wheel.

As another aspect of the present invention, the previously mentioned tractor lifting and support means is provided with a brake means for engaging the driven wheel which is opposite the one on which the log splitting tool is mounted.

It is therefore a primary object of the present invention to provide a log splitting apparatus that can easily be mounted on a conventional garden type tractor whereby the tractor engine is utilized for powering the log splitter.

It is another object of the present invention to provide a log splitting apparatus of the type described that includes a novel tractor lifting and support means for jacking up the driven tractor wheel and for maintaining the tractor in a stable position during the log splitting operation.

It is another object of the present invention to provide a log splitting apparatus of the type described that includes a tractor lifting and support means which can be pivotted from a log splitting position to a transporting position such that the log splitting tool can be monted and transported on the tractor.

It is another object of the present invention to provide a log splitting apparatus of the type described which is adapted to be mounted on the existing axle housing and draw bar of the tractor and which, with minor variations, can be easily adapted for use with various makes of tractors.

Further objects and advantages of the present invention will be apparent from the following description, reference being had to the accompanying drawings wherein preferred forms of embodiments of the invention are clearly shown.

DESCRIPTION OF THE PREFERRED EMBODIMENTS

Figure 1:
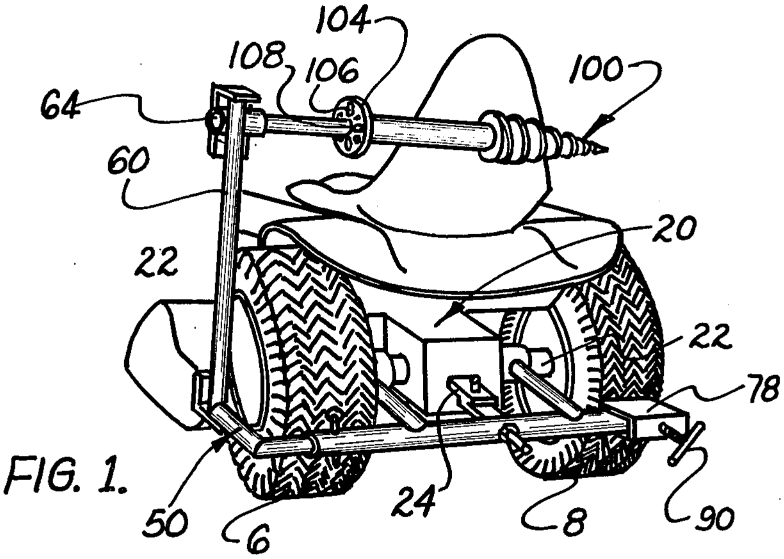
FIG. 1 is a perspective view of a conventional tractor showing the log splitting apparatus of the present invention mounted thereon with such apparatus being disposed in the mobile position.

Referring in detail to the drawings, FIG. 1 illustrates a conventional four-wheel tractor of the so-called ground breaking variety having typically eight or more horse power. Because of the relatively light weight of such tractors, it becomes necessary to use the tractor lifting and support means of the present invention when the tractor is used for log splitting operations.

The tractor of FIG. 1 includes a frame indicated generally at 20, an axle housing 22 and rear driven wheel 6 and 8, with each of the wheels including a hub 7 provided with conventional spaced threaded fasteners such as lugs which conventionally serve to mount a wheel rim 9 on the hub 7.

A log splitting tool indicated generally at 100 includes an inner mounting plate 104 provided with circumferentially spaced holes 106 which register with the lug spacing on the tractor hub.

In general, the log splitting tool, which includes the hollow shank 102, is secured to the driven wheel 6 by a plurality of lug extenders, not illustrated, which attach to the existing wheel lugs on the hub and which include outer threaded portions which register with the holes 106 of the mounting plate 104 of the log splitting tool.

A lug extender apparatus of the above-mentioned type is disclosed and described in detail in my co-pending applications U.S. Ser. No. 578,539 filed May 19, 1975, and U.S. Ser. No. 678,247 filed Apr. 19, 1976.

Figure 2:
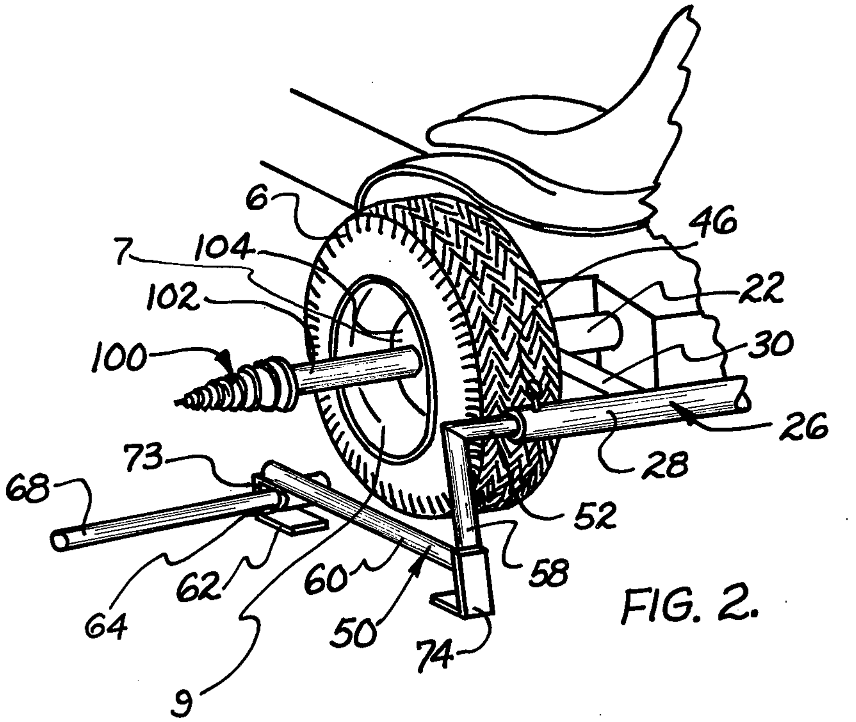
FIG. 2 is a partial perspective view of the tractor and apparatus of FIG. 1 which shows the apparatus disposed in a log splitting position.
Figures 3, 4, 5, 6:
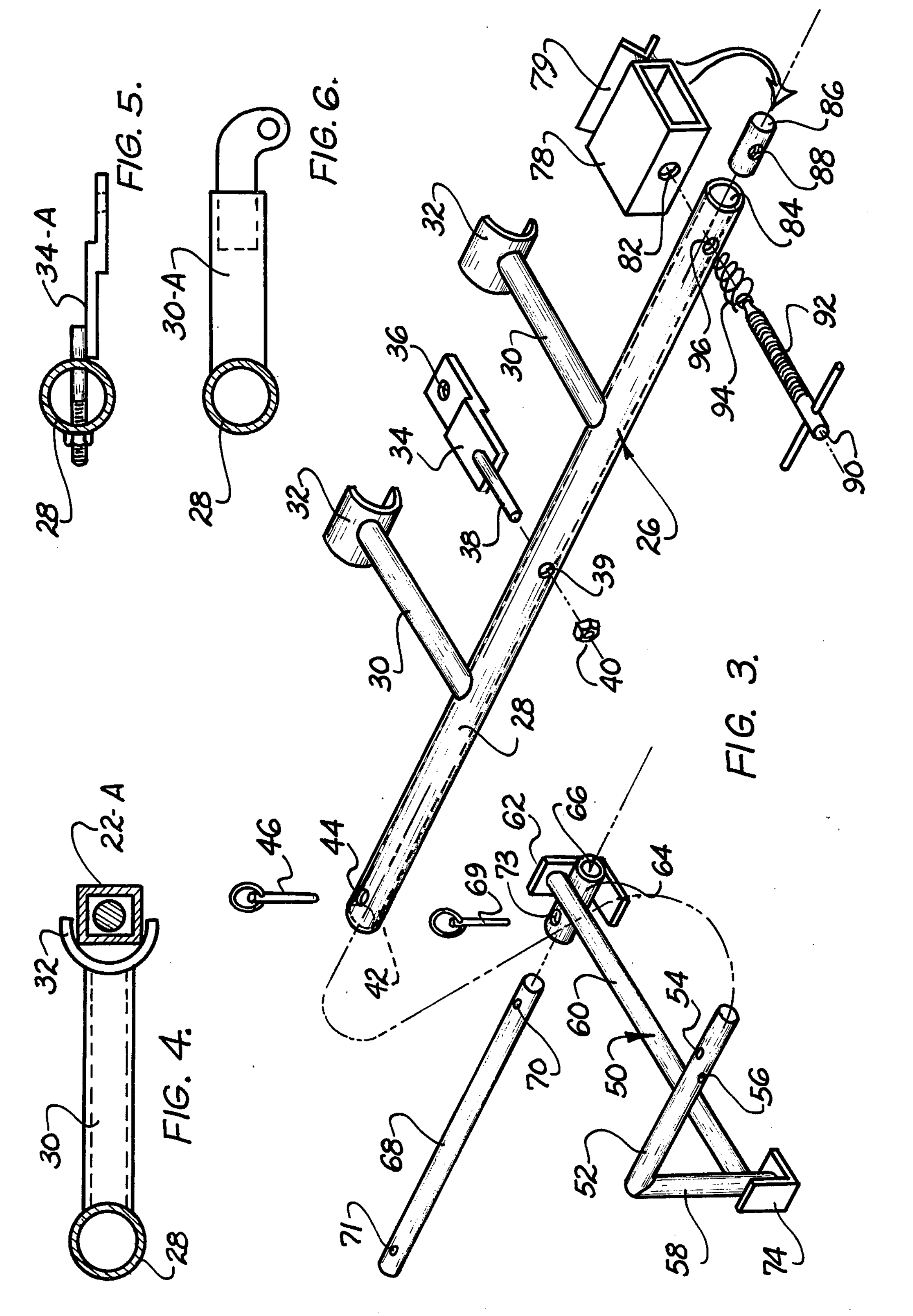
FIG. 3 is an exploded view of the tractor lifting and support means of the preceding figures.
FIGS. 4, 5, and 6 are side elevational views shows various mounting brackets incorporated in the lifting and support means and adapting same for attachment to various makes of tractors.

Reference is next made to FIGS. 1 through 3 which illustrate in detail the tractor lifting and support means which is indicated generally at 26 includes a transverse mounting member 28 in the form of a hollow tube, with such tube including an end hole 42 for pivotally receiving a male pivot portion 52 of a ground engaging portion indicated generally at 50.

With the apparatus in the log splitting position of FIG. 2, the ground engaging portion includes a forwardly extending member 60 which is positioned adjacent the driven wheel 6 and includes a socket 64 for removably mounting a log stop bar 68.

The ground engaging portion further includes feet portion 62 and 74 which directly engage the ground in the position of FIG. 2. With the ground engaging portion pivotted to the transporting position of FIG. 1, it is maintained in such position by a pin 46 which is inserted through holes 44 in the transverse member 28 as well as through holes 54 in the pivot portion 62, as seen in FIGS. 1 and 3.

It should further be mentioned that with the ground engaging portion in the mobile position, log stop bar 68 is extended inwardly as seen in FIG. 1 and maintained in such position by a removable pin 69 which extends through holes 73 in socket 64 as well as the hole 71 in stop bar 68.

It will now be seen that log splitting tool 100 can now be positioned on the horizontally extending stop bar 68 by extending such bar into a bore 108 provided in the shank 102 of the tool, see FIG. 1.

With reference to FIG. 3, transverse member 28 includes a plurality of forwardly extending brackets 30 which include forward bracket portions 32 shaped to conform with the axle housing 22 of the particular tractor. Transverse member 28 further includes a central bracket 34 which is mounted on the member by stud 38 and nut 40 with the former being extended through a hole 39. The forward portion of central bracket 34 includes a hole 36 that provides means for attaching the central bracket to a conventional draw bar 24 of the tractor with a pin being extended through the existing hole 36 in the mounting bracket.

FIG. 4 shows the bracket configuration 30 being utilized with a modified tractor axle housing 22-A and FIGS. 5 and 6 represent modified central brackets and outboard brackets 34-A and 30-A respectively with such alternate mounting brackets being adapted for use with tractors having different tongue and axle housing configurations.

Reference is again made to FIG. 3 which illustrates a brake means 78 that includes a forward wheel engaging portion 79. The housing of the brake means 78 slips over the right end of transverse member 28 with a forward wheel engaging portion 79 abutting the stationary driven wheel as it rests on the ground as seen in FIG. 1.

The bracket means further includes a tubular nut 86 provided with a central threaded hole 88 and the nut is positioned within the end hole 84 of transverse member 28 such that the threaded hole 88 lines up with a hole 96 in the transverse member and a hole 82 in the brake housing.

With continued reference to the brake, the threaded shank portion 92 of an actuating handle 90 is extended freely through hole 82 in the housing, then through compression spring 94, and into threaded engagement with tubular nut 86. It will now be understood that when actuating handle 90 is turned, then the threaded shank 92 is advanced and retracted with respect to transverse member 28. The inner end of shank 92 engages the inner front side of housing 78 and includes a conventional rotatable socket connection therewith so as to advance and retract wheel engaging portion 79 into and out of braking engagement with the wheel 8.

In operation, the left rear wheel of the tractor, FIG. 2, can be lifted from the ground by inserting pivot portion 52 of the ground engaging portion 50 into the second pivot portion of transverse member 28 formed by end hole 42. Using the forwardly extending member 60 of the ground engaging portion as a lever, with bracket 74 engaging the ground as a fulcrum, then the operator can exert force on member 60 while it is in an inclined position and thereby utilize leverage using the ground engaging portion as a jack lever. Once the wheel is lifted into the position of FIG. 2, then lock pin 46 is dropped through the holes 44 and 54, FIG. 3, so as to lock the ground engaging portion in position.

The brake means is then actuated by turning handle 90 to apply braking action to the ground engaging wheel 8.

The log splitting tool 100 is secured to the driven hub 7 of the lifted wheel 6, using the lug extenders previously mentioned herein, and with the log stop bar 68 in its outwardly extending position, FIG. 2, the log is split by moving the side of the log into engagement with the tip of the splitting tool 100 with the lower end of the log being positioned adjacent stop bar 68. The sharpened convolutions on the tool tip will then bore into the side of the log as the operator moves the side of the log against the tip.

After the log splitting operation is terminated then the ground engaging portion 50 is pivotted to its upwardly extending position of FIG. 1 and the log splitting tool 100 is removed from the hub and placed in the storage position of FIG. 1. When the brake 78 is released, the tractor is ready to proceed normally with the entire log splitting apparatus stowed thereon.

While the forms of embodiments of the present invention as herein disclosed constitute preferred forms, it is to be understood that other forms might be adopted.

What is claimed is:

1. A tractor mounted log splitter comprising, in combination, a tractor comprising a tractor frame, driven wheels including hubs, wheel discs removably mounted on said hubs, and a plurality of fixed and removable threaded wheel fasteners on each of said hubs; a log splitting tool removably mounted on one of said wheels and including an inner mounting plate provided with mounting holes that register with said threaded wheel fasteners whereby said mounting plate can be removably mounted on said hub by said fixed threaded wheel fastenrs; and tractor lifting and support means comprising a transverse mounting portion removably mounted on the rear of said tractor frame, and a ground engaging portion extending downwardly from said mounting portion and forwardly to a position below the level of one of said tractor wheels and adjacent said log splitting tool.

2. The tractor mounted log splitter defined in claim 1 wherein said tractor includes an axle housing and a draw bar and wherein said transverse mounting portion includes spaced forwardly extending mounting brackets engaging said axle housing, and a central mounting bracket removably attached to said draw bar.

3. The tractor mounted log splitter defined in claim 1 wherein said tractor includes an axle housing and a draw bar and wherein said ground engaging portion is pivotally mounted to said transverse mounting portion whereby manipulation by said ground engaging portion between an upper transporting position and a lower ground engaging position serves to raise one of said driven wheels clear of the ground.

4. The tractor mounted log splitter defined in claim 1 wherein said tractor includes an axle housing and a draw bar and wherein said transverse mounting portion includes a brake means for engaging and preventing rotation of the other one of said wheels.

5. The apparatus defined in claim 1 wherein said brake means includes a wheel engaging portion movably mounted on said transverse mounting portion; and a manual actuator for moving said wheel engaging portion between braked and unbraked positions.

6. The apparatus defined in claim 1 wherein said ground engaging portion includes a laterally extending stop bar adjacent said one wheel.

7. The apparatus defined in claim 1 wherein said ground engaging portion is pivotable to an upwardly extending storage and transporting position; an accessory transporting bar extending inwardly from said ground engaging portion and above said tractor frame; and an accessory tool removably carried on said bar.

8. The apparatus defined in claim 1 wherein said ground engaging portion is pivotable to an upwardly extending storage and transporting position; a detachable connector on the end of said ground engaging portion; and a log stop bar including a second detachable connector for selectively mounting said stop bar in either an outwardly extending log engaging position or an inwardly extending tool storage position.

9. A tractor mounted accessory driving means comprising, in combination, a tractor comprising a tractor frame, including a transverse axle housing, a draw bar, and rear driven wheels, each of which includes a hub; a driven accessory removably mounted on the hub of one of said wheels; tractor lifting and support means comprising a transverse mounting member removably mounted on said axle housing and draw bar, said mounting member including an end portion forming a first jack pivot portion and a longitudinally extending lifting and support member including an upper portion provided with a second jack pivot portion pivotally mounted on said first pivot portion and a ground engaging portion extending adjacent and on a lower level than one of said wheels.

10. The apparatus defined in claim 9 wherein said transverse mounting member includes a brake means for engaging and preventing rotation of the other one of said wheels.

11. The apparatus defined in claim 10 wherein said brake means includes a wheel engaging member movably mounted on said transverse mounting member; and a manual actuator for moving said wheel engaging member between braked and unbraked positions.

12. The apparatus defined in claim 9 wherein said ground engaging portion includes a laterally extending stop bar adjacent said one wheel.

13. The apparatus defined in claim 9 wherein said ground engaging portion is pivotable to an upwardly extending storage and transporting position; an accessory transporting bar extending inwardly from said ground engaging portion and above said tractor frame; and an accessory tool removably carried on said bar.

14. The apparatus defined in claim 9 wherein said ground engaging portion is pivotable to an upwardly extending storage and transporting position; a detachable connector on the end of said ground engaging portion; and a log stop bar including a second detachable connector for selectively mounting said stop bar in either an outwardly extending log engaging position or an inwardly extending tool storage position.

* * * * *